US006925219B2

United States Patent
Pfeiffer

(10) Patent No.: US 6,925,219 B2
(45) Date of Patent: Aug. 2, 2005

(54) DEVICE FOR A PASSIVE OPTICAL NETWORK

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 92 days.

(21) Appl. No.: 10/440,244

(22) Filed: May 19, 2003

(65) Prior Publication Data

US 2003/0235363 A1 Dec. 25, 2003

(30) Foreign Application Priority Data

Jun. 24, 2002 (EP) .............................. 02360188

(51) Int. Cl.$^7$ ................................. G02B 6/42
(52) U.S. Cl. ................. 385/16; 385/24; 398/4
(58) Field of Search .................. 385/16–24; 398/3, 398/4

(56) References Cited

U.S. PATENT DOCUMENTS

| | | | |
|---|---|---|---|
| 5,510,917 A | 4/1996 | Corke et al. | |
| 6,058,229 A | 5/2000 | Burrows et al. | |
| 6,137,603 A | * 10/2000 | Henmi .......................... | 398/4 |
| 6,178,025 B1 | 1/2001 | Hardcastle et al. | |
| 2001/0026384 A1 | 10/2001 | Sakano et al. | |
| 2002/0067523 A1 | 6/2002 | Way | |

OTHER PUBLICATIONS

Chlamtac I et al.: "Scalable WDM network architecture based on photonic slot routing and switched delay lines" INFOCOM '97 Sixteen Annual Joint Conference of the IEEE Computer and Communications Societies. Driving the Information Revolution., Proceedings IEEE Kobe, Japan Apr. 7–11, 1997, Los Alamitos, CA, USA, IEE Comput. Soc, US, Apr. 7, 1997, pp. 769–776, XP010252079.

* cited by examiner

*Primary Examiner*—Phan T. H. Palmer
(74) *Attorney, Agent, or Firm*—Sughrue Mion, PLLC

(57) ABSTRACT

Passive optical networks are generally built from a central office and a plurality of passive optical nodes. Over a main path, optical signals are transmitted to the nodes. When a fault, e.g. a cable break, occurs on the main path, the optical signals are transmitted to the nodes over a reserve path. When the fault has been removed, switchback to the main path is effected and the optical signals are again transmitted to the nodes over the main path. The device according to the invention is particularly characterized in that an additional optical signal is provided which is transmitted at a wavelength outside the wavelength range used for the transmission of useful optical signals over the main path, and which is used to power an electric circuit within the device which, in turn, controls a switch that switches between main path and reserve path.

7 Claims, 1 Drawing Sheet

DEVICE FOR A PASSIVE OPTICAL
NETWORK

This invention relates to a device for a passive optical network and is based on a priority application No. EP 02360188.3, which is hereby incorporated by reference.

BACKGROUND OF THE INVENTION

Passive optical networks are generally made up of at least one center, the so-called central office, and a plurality of passive optical nodes. The nodes are connected to the central office(s) by optical fibers. Various network topologies can be used for this purpose, such as star network, ring network, tree structure, etc. To minimize failures, each node is connected to a central office by at least two different optical fibers. Over a main path, optical signals are transmitted to the node. When a fault, e.g. a cable break, occurs in the main path, the optical signals are transmitted to the nodes over a reserve path. When the fault has been removed, switchback to the main path is effected and the optical signals are again transmitted to the nodes over the main path.

One possibility of implementing this switchover is disclosed in EP 0973288. There, each node comprises an electric switch which is controlled by a detector and, in one preferred embodiment, by a control unit, and which is switched from the main path to the reserve path when a fault occurs in the main path. An optical coupler is provided which taps e.g. 10% of the received signal level from the main line and transfers it to the detector, which is implemented as a threshold detector or comparator, for example. The power needed by the control unit is supplied from a local power source.

SUMMARY OF THE INVENTION

The object of the invention is to provide an alternative solution for the implementation of the switchover.

This object is attained by a device for a passive optical network, comprising an optical switch for switching between a main optical path and a reserve optical path, the switch being designed to be controllable by a remotely powered electric circuit, the power being supplied via an additional optical signal which is transmitted over the main path at a wavelength lying outside the wavelength range used for the transmission of useful optical signals over the main path, via a wavelength-selective optical coupler connected to the main path for extracting the additional optical signal, and via a photodiode connected to the wavelength-selective optical coupler. The device is particularly used to power an electric circuit within the device which, in turn, controls a switch that switches between main path and reserve path.

In case of a fault, e.g. a cable break, in the main path, no useful signal is received by the device, which is contained in a node of the passive optical network. At the same time, the node no longer receives an additional signal. The electric circuit is no longer supplied with power, so that no control signal is applied to the switch. The latter then automatically changes to its alternative position, in which it connects the node to the reserve path. The node then receives useful signals over the reserve path. After removal of the fault, the electric circuit is again powered by the additional signal and controls the switch in such a way that it connects the node to the main path. In this manner, a passive device is provided which does not need a local power source. The device is of a low-cost design and permits the implementation of passive nodes without local power supply. As optical networks contain large numbers of nodes, low-cost optical networks can be implemented. The device is compact, requires few components, and does not interfere with the transmission of useful signals. Through the separation of the wavelength ranges in which useful signals and additional signal are transmitted, interaction is minimized and the transmission capacity in the optimized transmission window for the useful signals is maximized. Through the use of an optical switch for transferring the useful signals, the latter are virtually unaffected. Furthermore, because of the transmission over the same optical fiber, a direct relationship exists between the received signal level of the useful signals and the signal level of the additional signal, so that the reception quality of the additional signal represents a good indicator of the reception quality of the useful signal. This can be used to advantage for fixing a threshold from which a switchover to the reserve path is to be effected; for instance, in case of a fault on the main path, switchover is automatically effected from a predetermined dB value.

Advantageous developments are apparent from the dependent claims and the following description.

BRIEF DESCRIPTION OF THE DRAWINGS

An embodiment of the invention will now be explained with reference to the accompanying drawing, in which:

The embodiment will first be explained with the aid of FIG. 1. FIG. 1 shows an optical network in accordance with the invention.

BEST MODE FOR CARRYING OUT THE INVENTION

Figure 1:
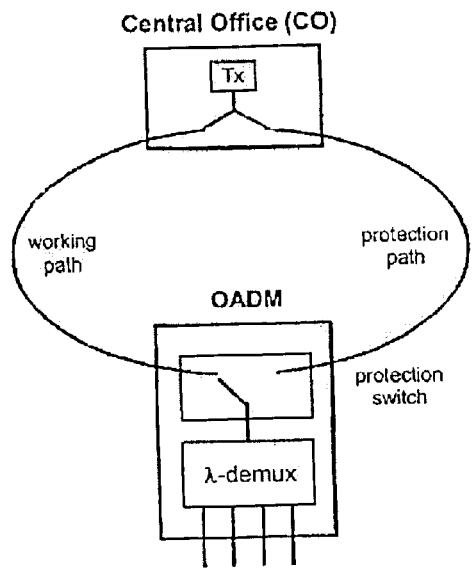
FIG. 1 is a schematic representation of an optical network in accordance with the invention.

A passive optical network is built from of at least one central office and a plurality of nodes which may be interconnected in various ways, for example in the form of a star, ring, or tree network. In FIG. 1, one central office CO and one node OADM are shown by way of example. Node OADM is designed as an optical add-drop multiplexer, for example, but may also be implemented with other elements, such as an optical cross connect, optical splitter, etc. Central office CO and node OADM are interconnected by a main path and a reserve path. Useful optical signals are generated at central office CO and transmitted over the main path, which consists of at least one optical fiber, to node OADM. The main path and the reserve path may each be designed as a unidirectional or bidirectional link. Node OADM contains a device for switching between main path and reserve path. When a fault occurs on the main path which results in no optical power being measured in node OADM or in this optical power being too low, the device switches to the reserve path. Useful optical signals are transmitted in parallel over the main path and the reserve path. This has the advantage that in case of a switchover to the reserve path, the useful signals can be received uninterrupted in time, and the disadvantage that in case of no fault in the main line, redundancy is transmitted in the network which reduces the transmission capacity in the network. Alternatively, useful optical signals are transmitted over the reserve line only in case of a fault. This has the advantage that less signal power is needed and that the reserve path can be used for the transmission of additional useful signals, and the disadvantage that a short time delay is caused by the switchover to the reserve path, since the transmission of useful signals over the reserve path cannot take place until the central office has been informed by node OADM.

In a passive optical network it is advantageous if each node contains purely passive elements, which do not require power to perform their functions. This saves operating and maintenance costs and makes it possible to place nodes at arbitrary locations, particularly where there is no local power source. In addition, the manufacturing costs of the nodes are reduced. Each node contains a wavelength-division multiplexer λ-demux, for example. This demultiplexer consists of wavelength-selective filters, for example. These are purely passive and do not require any source of energy. Thus, the operation of the passive optical network is independent of the power supply mains. It is not necessary to provide any protective mechanisms against mains failure or mains fluctuations.

The optical network according to the invention is designed to transmit over the main path, together with the useful optical signals, an additional optical signal which supplies energy for the device according to the invention and serves as a criterion of reception. The additional signal is transmitted in a different wavelength range than the useful optical signals, whereby interaction is minimized and the transmission capacity in the optimized transmission window for the useful signals is maximized.

Figure 2:
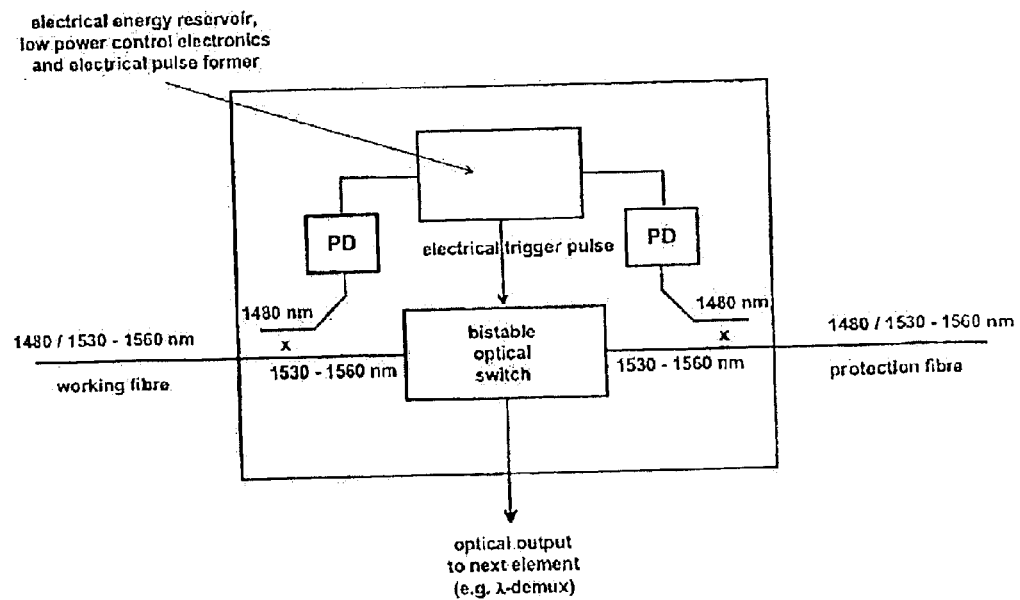
FIG. 2 shows schematically the structure of a device in accordance with the invention.

The embodiment will now be further explained with the aid of FIG. 2. FIG. 2 shows a device in accordance with the invention.

The device for a passive optical network comprises a bistable optical switch for switching between a main optical path and a reserve optical path. The switch is designed to be controllable by a remotely powered electric circuit, the power being supplied via an additional optical signal which is transmitted over the main path at a wavelength lying outside the wavelength range used for the transmission of useful optical signals over the main path. In the device, optical-to-electrical conversion takes place. The electric signal is fed to the electric circuit. The device further comprises a wavelength-selective optical coupler connected to the main path for extracting the additional optical signal, and a photodiode connected to the wavelength-selective optical coupler.

The electric circuit comprises an energy reservoir which is charged by the output signals of the photodiode. The energy reservoir comprises a capacitor or a rechargeable battery or a storage battery.

In one preferred embodiment, the electric circuit comprises a threshold detector for monitoring the output signal of the photodiode and for sending a control signal to the switch for the purpose of connecting the latter to the reserve path if the signal level received by the photodiode lies below the threshold.

In another preferred embodiment of the invention, power is also supplied to the electric circuit via a further additional optical signal which is transmitted over the reserve path at a wavelength lying outside the wavelength range used for the transmission of useful optical signals over the reserve path. Also provided are a further wavelength-selective optical coupler which is connected to the reserve path for extracting the further additional optical signal, and a further photodiode connected to the further wavelength-selective optical coupler.

The electric circuit then comprises e.g. a comparator for comparing the output signals of the photodiodes and for sending a control signal to the switch for the purpose of connecting the latter to the path over which a higher signal level is being received. If the signal level being received by the photodiode connected to the main path is higher than the signal level being received by the photodiode connected to the reserve path, an electric trigger pulse will be generated which controls the switch in such a way that the element following the device in the node is connected to the main path. If that signal level is lower, an electric trigger pulse will be generated which controls the switch in such a way that the next element of the node is connected to the reserve path. Alternatively, the electric circuit comprises e.g. two comparators for comparing the output signals of the photodiodes with different threshold values. Preferably, the signal of the main path is transferred. Only when this signal falls below a predetermined threshold value will the reserve-path signal be transferred. Alternatively or in addition, weighting may be performed to determine which signal has the greater distance to the respective threshold value and, therefore, the higher signal-to-noise ratio. Then, the signal with the higher signal-to-noise ratio will be transferred. Temporary variations in the supply signal can be compensated for by the energy reservoir, namely by comparing not the output signals of the photodiodes, but the associated energy reservoirs.

In a further preferred variant, instead of a so-called latching switch, which locks in either of two positions, a so-called nonlatching switch is used, which is held in one position as long as a voltage is applied, and which changes to the other position when the voltage is removed. As a default position, the reserve path is chosen. When a supply signal is being received over the main path, a voltage is generated which holds the switch in the non-default position and extends the main path. When no or too small a supply signal is being received over the main path, no voltage is generated that could hold the switch in the non-default position. Consequently, the switch automatically changes to the default position and, thus, to the reserve path. Temporary variations in the supply signal are compensated for by the energy reservoir. The latching switch is, for instance, a micromechanical switch, e.g. a so-called MEMS switch; MEMS=MicroElectroMechanical System.

The useful signals are transmitted in the wavelength range of 1500 to 1600 nm, and the additional optical signals are transmitted in the wavelength range of 1400 to 1500 nm. In a preferred embodiment, the useful signals are transmitted in the wavelength range of 1530 to 1560 nm, and the additional signals are transmitted in the range around 1480 nm. Particularly for 1480 nm, high-performance semiconductor lasers are available. In addition, losses in optical fibers are small in this range. Just a few mW of optical power, made available at the location of the device according to the invention, suffice to operate the electric circuit of the device. The electric circuit is preferably of a low-power design, i.e., it has minimum power consumption. And the bistable optical switch requires only an electric trigger pulse for switching, but no continuous steady current for holding the switch in the selected position.

What is claimed is:

1. A device for a passive optical network, comprising an optical switch for switching between a main optical path and a reserve optical path, the switch being designed to be controllable by a remotely powered electric circuit, the power being supplied via an additional optical signal which is transmitted over the main path at a wavelength lying outside the wavelength range used for the transmission of useful optical signals over the main path, via a wavelength-selective optical coupler connected to the main path for extracting the additional optical signal, and via a photodiode connected to the wavelength-selective optical coupler.

2. A device as set forth in claim 1, wherein the electric circuit comprises an energy reservoir which is charged by the output signals of the photodiode.

3. A device as set forth in claim 2, wherein the energy reservoir comprises a capacitor or a rechargeable battery or a storage battery.

4. A device as set forth in claim 1, wherein the electric circuit comprises a threshold detector for monitoring the output signal of the photodiode and for sending a control signal to the switch for the purpose of connecting the switch to the reserve path if the signal level received by the photodiode lies below the threshold.

5. A device as set forth in claim 1, wherein the power is also supplied to the electric circuit via a further additional optical signal which is transmitted over the reserve path at a wavelength lying outside the wavelength range used for the transmission of useful optical signals over the reserve path, via a further wavelength-selective coupler connected to the reserve path for extracting the further additional optical signal, and via a further photodiode connected to the further wavelength-selective optical coupler.

6. A device as set forth in claim 5, wherein the electric circuit comprises a comparator for comparing the output signals of the photodiodes and for sending a control signal to the switch for the purpose of connecting the switch to the path over which a higher signal level is being received.

7. A device as set forth in claim 1, wherein the useful signals are transmitted in the wavelength range of 1500 to 1600 nm, and that the additional optical signals are transmitted in the wavelength range of 1400 to 1500 nm.

* * * * *